Patented Feb. 4, 1941

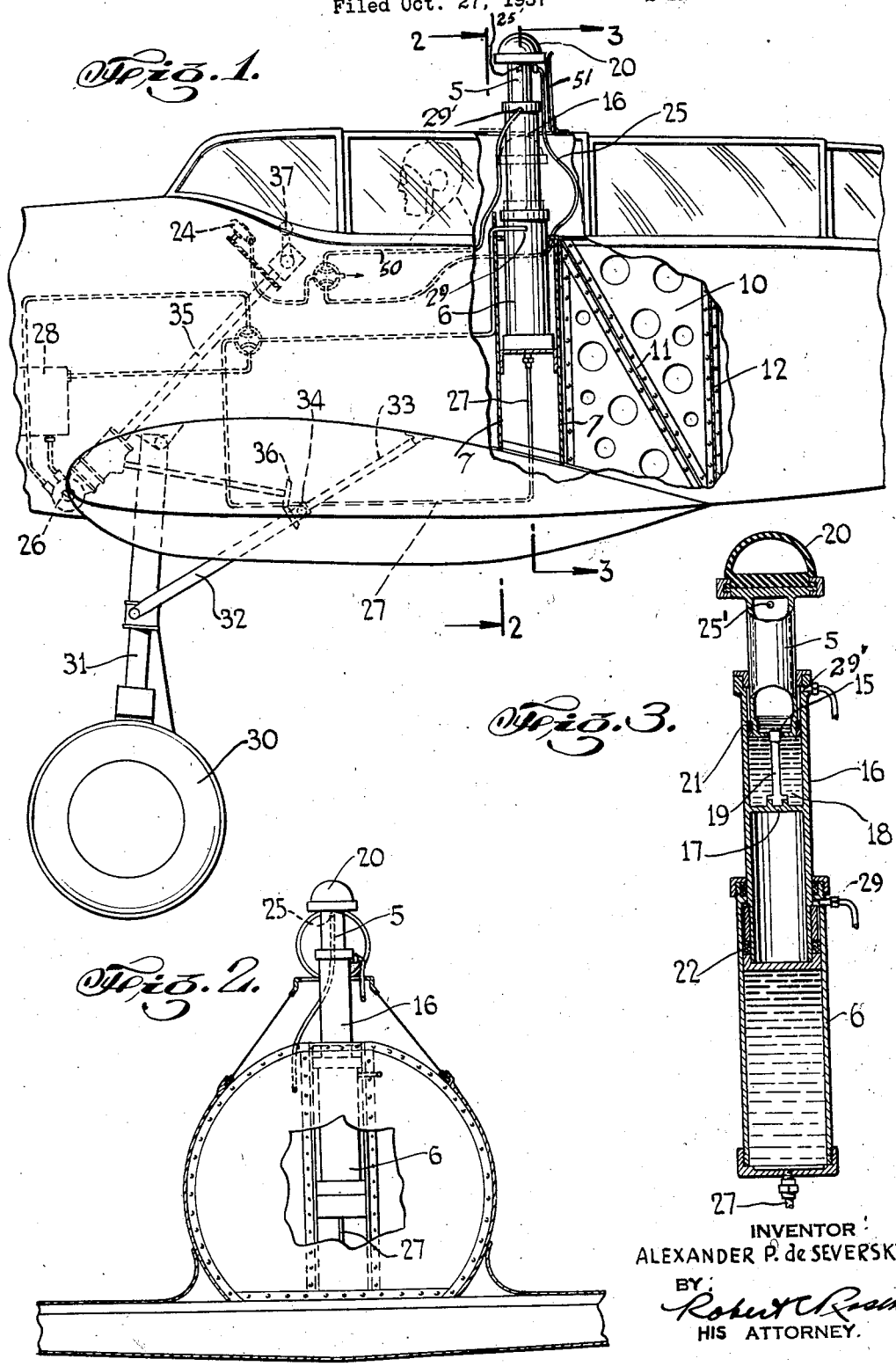

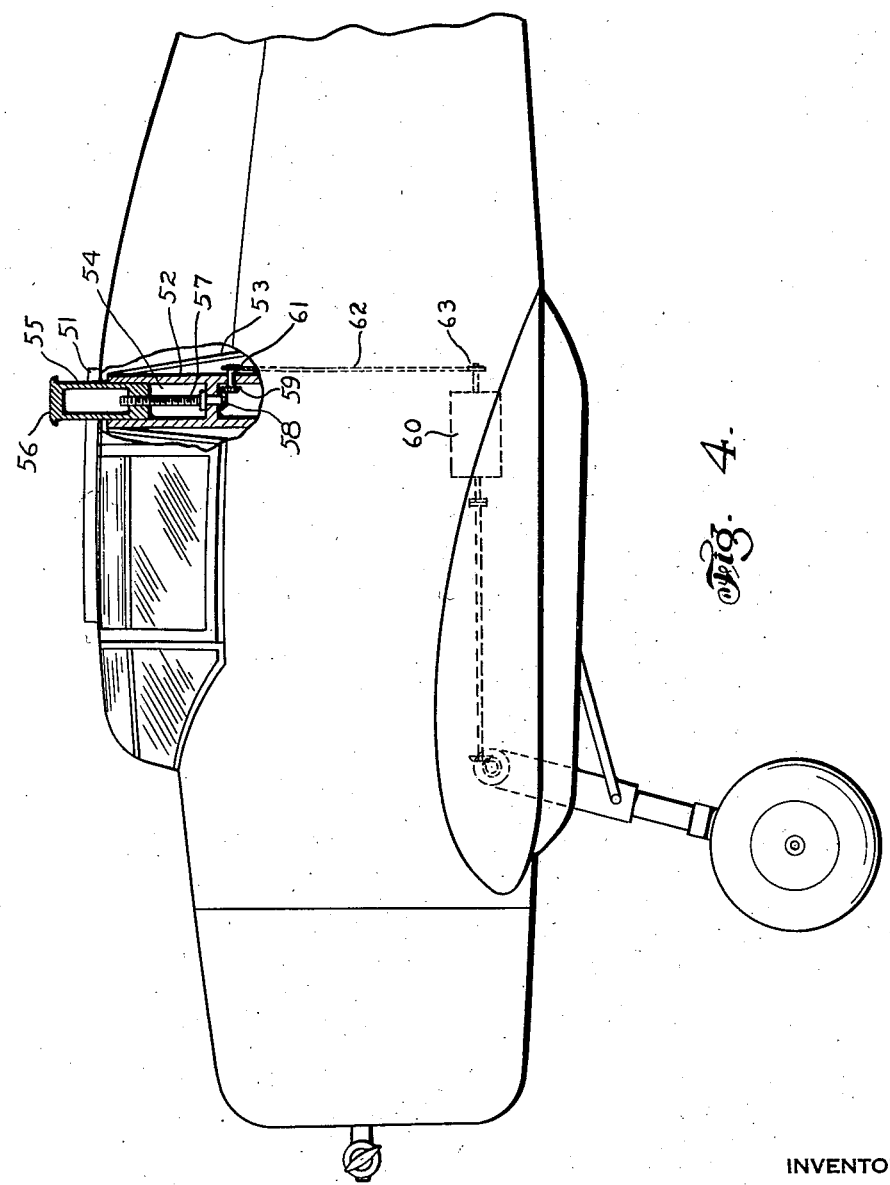

2,230,614

UNITED STATES PATENT OFFICE 2,230,614

AIRCRAFT STRUCTURE

Alexander P. de Seversky, Asharoken Beach, N. Y., assignor to Seversky Aircraft Corporation, a corporation of Delaware Application October 27, 1937, Serial No. 171,215

8 Claims. (Cl. 244—100)

The present invention relates to airplanes and its chief object is to provide a construction forming a part of the fuselage structure such that if, upon landing, the craft noses over and lands upon its back, a crushing of the top of the fuselage, or injury to the pilot and passengers will be prevented.

Another object is to provide a crash protector the total height of which above the cockpit can be automatically reduced to the minimum during flight, in order that unnecessary drag, etc. may be avoided and yet wherein the height may be sufficiently increased, when landing or taking off, to provide the requisite distance of the protecting means above the pilot's head.

Another object is to provide a crash protector which can be raised by the lowering of the landing gear, in one simultaneous operation.

A further object is to provide a crash protector which will not only prevent structural damage to the airplane but will directly absorb nosing-over shocks and minimize the stress upon the fuselage and jars to the pilot and passengers.

The invention also aims to provide a crash protector of this improved nature which will nonetheless obscure the field of vision of a pilot or passenger in an after cockpit by only the minimum amount.

For the purposes of exemplification, the invention will be herein described as embodied in a multiple cockpit airplane with the crash protector built in rigidly with one or more transverse members, such as the bulkheads between two cockpits. It will be understood, however, that this particular embodiment is illustrative merely and that the invention may be embodied in any construction within the scope of the subjoined claims.

The nature and objects of the invention will be better understood from a description of a particular embodiment, for the purpose of which description reference will be had to the accompanying drawings forming a part hereof and in which—

Figure 1 is a broken-away side view, partly in section, showing a crash protector construction in accordance with the invention embodied in an aeroplane fuselage, Figure 2 is a transverse sectional view taken on the line 2—2 of Fig. 1, Figure 3 is a sectional view taken on the line 3—3 of Fig. 1, and Figure 4 is a diagrammatic side elevation, partially broken away, of a modification.

In the embodiment illustrated in Figures 1-3, inclusive, the fuselage of an airplane is constructed with certain members projectible, on occasion, a distance above the top, or uppermost portion, of the fuselage, including the canopies or cabin-tops, and sufficient to support the static weight and absorb the impact energy of the airplane, when same inverts and lands on its back, as in an outside, vertical ground-loop (due to "nosing-over"). Thereby the chances of damage to the superstructure and fuselage, and to the occupants, is reduced to the minimum.

More specifically, these protective means comprise a member 5 for directly engaging the ground, and movable vertically by the impact of a nose-over-landing, in a vertical cylinder 16. The strut 5 is also positively adjustable, automatically, into the extended position shown in full lines in Fig. 1, when preparing for landing and positively retractible, automatically, into the retracted position shown in dotted lines in Fig. 1, in order not to diminish or interfere with, the aerodynamic characteristics of the fuselage, etc.

In the construction shown, the strut-member 5 is mounted in the cylinder 16 in such manner as to be vertically reciprocable therein, the cylinder 16 being in turn mounted for vertical reciprocation in a cylinder 6. The cylinder 6 forms a rigid stationary part of a bulkhead 7 located rearwardly of the forward cockpit, and is braced by longitudinally-extending web members 10 lying at the sides of the fuselage and including a truss 11. Both the web and the truss are secured to another bulkhead 12, of the fuselage, farther aft. Any stresses arising in the strut-system are therefore satisfactorily distributed throughout the fuselage-framing, and thus nosing-over forces are taken off the portions of the fuselage that lie closely adjacent the cockpits. Thereby the superstructure, such as canopies, and the fuselage structure, such as bulkheads, at the cockpits especially, are effectively protected against crushing in the event the craft noses over on landing, and, if the occupants are, as is usual, strapped in on landing, they are also protected from sudden contact with hard objects.

The structure cooperating with the strut 5 includes not only means for taking the weight and impact of the airplane and for automatically projecting the strut to the desired protective height on landing and retracting it, out of the air stream during flight, but also incorporates means for absorbing shocks to the end that the occupants will not even be jarred if the plane lands on its back.

The structure and arrangement shown in Figures 1-3 inclusive, provides all these features, and includes a hollow interior in the strut 5, with an aperture 15 in the bottom end of the strut. The strut 5, as mentioned, is vertically movable up and down, in the cylinder 16, and the topmost end of the strut is constructed with a closed hemispherical rubber pneumatic cap 20, which dissipates the initial sharp impact-energy when the strut 5 first contacts the ground, and reduces the immediately following stress arising in the strut itself. The cylinder 16 fits within, and is similarly vertically movable in, the cylinder 6. The cylinder 16 thus constitutes an intermediate plunger for the parts 5 and 6. Plunger 16 is constructed with a substantially centrally located horizontal partition 17, defining a chamber 18 in the plunger. Chamber 18 is filled with oil to such an extent that it rises in member 5 sufficiently to always stand at a level somewhat above the bottom wall of strut 5, leaving quite a large chamber, filled with air, above the oil-level in strut 5.

A valve 19 is provided in the cylinder 16, and it has a head somewhat larger than the rest of it. Suitable packing is provided at 21 between the strut 5 and the plunger 16, and at 22 between the plunger 16 and cylinder 6.

When the airplane noses over and lands on its back, if the strut 5 is protruded at all above the superstructure of the airplane, the immediate impact energy of the outside ground loop will be entirely absorbed by the "return," upward, forcing of the oil through the quite restricted aperture at 15, and by compressing the air in the upper part of strut 5 and the air in cap 20, the strut moving down in cylinder 16, the cylinder 16 remaining stationary in cylinder 6. If desired, however, the protector-structure can be employed without this particular oil-valve shock-absorber arrangement.

The crash-protector is extended into its uppermost position by forcing air under pressure into the upper part of the hollow strut 5, through an aperture 25¹ therein, to raise strut 5 in cylinder 16, and by simultaneously or subsequently forcing oil into cylinder 6 to raise plunger 16 in cylinder 6. For raising strut 5, an air pump 24 is connected by a flexible air hose 25 to the air inlet 25¹ in strut 5, and as air is pumped into the hollow, the strut rises relatively to plunger 16, opening the aperture at 15, by this action forcing the oil level in strut 5 through aperture 15 into plunger 16. For raising plunger 16, oil is forced into the cylinder 6 by an oil pump diagrammatically indicated at 26, through a flow-and-return pipe 27.

In adjusting the device for landing or for flying, oil is pumped to and from the cylinder 6 from an oil tank 28 through the single line 27. The pumping of the oil from the cylinder 6 will directly and positively retract the plunger 16 in the cylinder 6 and render it unnecessary to provide any arrangement for forcing oil into the top of cylinder 6 in order to force plunger 16 downwardly. Pumping air from the plunger 5 through the aperture 25¹ and flow and return line 25 will ordinarily be sufficient to retract the strut 5 into the position shown in dotted lines in Fig. 1, but, if desired, more positive control may be obtained by pumping air or oil into the top of the plunger 16, as through an aperture 29¹ and a piping line, not shown. A port 29 is preferably connected to the oil pump by suitable piping in order to give a positive oil pressure on the lower end of plunger 16 for positively retracting plunger 16 in conjunction with the hydraulic retraction of the landing gear, if such type of retraction be employed. In such case, the retracting oil-line system is connected to port 29 and to lowering line 27, thus affording simple means of connecting the retractable landing gear and the retractable crash protector. If desired, in order to more positively lower the strut 5 into the position shown in dotted lines in Fig. 1, an additional airline, such as that shown at 50 in Fig. 1 for forcing air under pressure into the space between 5 and 16, may be provided, in which case a two-way air valve, not shown, is incorporated in pump 24. By these means, the air in cylinder 5, can, if desired, be exhausted into the atmosphere, while the air is being forced into the space between the strut 5 and the plunger 16. Then, in landing, the airline 25 is closed off by the pilot's operating a valve, not shown, in the air pump 24, so that the extra air pressure generated by the impact will not bring unbalanced loads onto the air pump.

Inasmuch as it is contemplated to retract and project the strut 5 at the same time that the landing gear is retracted and lowered, if a retractable landing gear is used, the landing gear and strut may conveniently be operated for simultaneous retraction or extension by the same source of power, such as a motor or hand crank. In Fig. 1 there is diagrammatically indicated a retractable landing gear whereby the wheel 30 carried by the shock absorber strut 31 is retracted by a link 32 through a screw and nut mechanism 33, 34. The screw is shown diagrammatically as rotated by shaft 35 through bevel gears 36 and connecting gearing. The shaft 35 is driven from a suitable hand crank 37 or a motor. For the purposes of illustration the pump 26 for pumping oil to and from the cylinder 6 and the air pump 24 for pumping air to the hollow strut 5 are diagrammatically shown as connected to be operated by the hand crank 37 and shaft 35.

It is contemplated that the construction of the crash protector shall obstruct as little as possible the forward view of the pilot or passenger or observer in the cockpit to the rear of the crash protector or the rearward view of the occupant of the front cockpit. The crash protector of the present invention is adapted eminently to accomplish this, and is made as narrow as feasible at the height of the line of vision above the top of the fuselage, and in the construction shown the width of this structure is less than, or not substantially greater than, the width of the head and neck of the pilot. The pilot, therefore, when turning to look backward may easily move his head to one side or the other of the protector, and the passenger in the rear cockpit when looking forward may easily get a clear view ahead.

It is also contemplated that the construction shown can be applied to open cockpit planes, in which case the construction will be carefully streamlined, as for example by providing a streamline fairing, and also that it will be applied to canopy, or covered cockpit, and/or cabin type of aeroplanes, in which case the forward cover will be arranged to slide rearwardly above the then retracted vertical strut 5 so as to be out of the way of the strut as it is moved to operative position for landing. As a precaution against damage to the cover the arrangement may be such that the strut may be projected up also when the cockpit is completely closed and the forward cockpit cover is in closed position. Such an arrangement is shown in Fig. 1 and includes a spring-hinged flap 51, for covering the necessary opening in the top of the canopy.

It is contemplated by the present invention that the arrangements for projecting and retracting the crash protector be variously modified, and mechanical means may be arranged for projecting or retracting the crash protector and the retractable landing gear preferably simultaneously, and the operating means for both may be hydraulic, mechanical, electrical, pneumatic, or any desired combination of these. All the devices, also, may be operated either by hand or by a suitable motor. Furthermore, the operating mechanism can be inter-connected with any of the controls in the cockpit, such as the throttle, the tail wheel projecting device, or other controls instead of the landing gear projecting control, if desired.

In the form shown in Fig. 4, there is provided a crash protector embodying the present principles, which is operated non-hydraulically, being operatively connected to the non-hydraulically operated landing-wheels retracting mechanism. The construction shown comprises a vertical cross-head or guide 52, located just aft of the pilot and suitably rigidly mounted and braced, as by members 53 and having a groove 54 in which a land 55 on a slat or post-member 56 is vertically reciprocable. In the illustrative embodiment, the means for reciprocating the slat comprise a reversible screw-rod 57, threaded into the slat and carrying a bevel-gear 58 rigidly on its lower end. A meshing bevel-gear 59 is rigidly mounted on a stub-shaft in the guide 52, and the shaft is adapted to be driven from the wheel-retracting mechanism 60 by means of a sprocket-wheel 61, a sprocket-chain 62, and another sprocket-wheel 63. Thus, when the pilot, in preparing to land, sets the wheel-retracting mechanism in operation, the slat 56 is automatically protruded upwardly, pushing open the spring hinged-plate 51, until the slat extends the minimum distance above the pilot's head requisite for his safety. When, upon taking-off, the pilot sets the wheel-retracting mechanism in operation, the slat is automatically retracted into the housing and the spring-loaded flap closes the aperture in the canopy, thus obviating speed losses, etc. that would arise were the slat and flap left protruded in flight.

It is contemplated that the strength of the crash-protector structure be such as to either rigidly resist the impact and static forces of an overturn, without yielding at all, or be such as to intentionally yield and crush to such an extent as to absorb this energy, in either case relieving the fuselage etc. of all dangerous forces.

It is to be observed that, among the other advantages flowing from the construction of the present invention, the canopy, cabin, or other superstructure can be made quite substantially lower than is usual, in order to provide more nearly perfect streamlining, etc. of the fuselage, yet a clearance between the top of the pilot's head and the most protuberant point on the upper side of the airplane of at least the minimum amount requisite for the pilot's safety in case of accident, will also be provided thereby.

I claim:

1. In an airplane, a fuselage having a crash protector comprising a member movable vertically to project above the top of the fuselage, a cockpit cover movable rearwardly above and rearwardly past said member when said member is in retracted position said cover having an opening for passage of said member and a spring-hinged flap for streamlining said opening and means to project said member upward with reference to the fuselage to a position to support the air plane when the aircraft inverts against a landing area.

2. In an airplane, a fuselage, a canopy and means projectible above the canopy to support the weight and impact of the fuselage when it inverts against a landing area, said means including a hydraulic shock absorber, said hydraulic shock-absorber being mounted concentrically in said projectible means, and means for projecting said shock-absorber independently of the said projectible means.

3. In an airplane, a fuselage having a crash protector comprising a guide member rigidly secured in the fuselage, a strut movable in said guide to project above the top of the airplane, means connected to said strut to move the same vertically in said guide, a retractable landing gear, means for projecting and retracting the same, and a common actuating means connected to contemporaneously actuate both the said crash protector and the retractable landing gear.

4. In an airplane having a fuselage and a retractable landing gear, a crash protector comprising a cylinder mounted in the fuselage, a plunger member movable in said cylinder, a shock absorber strut movable in the plunger to project above the fuselage and forming therewith a hydraulic shock absorber, said strut having a pneumatic shock-absorber on its upper end to absorb minor shocks before the hydraulic shock-absorber comes into action and common means to project said landing gear and to force said plunger upward in the cylinder and independently operable to project the shock absorber strut upward in the plunger to project the latter above the fuselage.

5. In an airplane, a fuselage having a crash protector, comprising a guiding-frame mounted in the fuselage, a slat-member movable in said frame and screw means in the fuselage for moving said slat upwardly in said frame above the uppermost part of the fuselage, a retractable landing gear, a single actuating means, and connections between said actuating means, the screw means and the retractable landing gear for actuating both the slat-member and the retractable landing gear in unison.

6. In an airplane, a crash protector comprising a member movable to project above the airplane and adapted to support the airplane when same rests upon said member and adapted to be retracted out of the windstream when not in use, a liquid container carrying the projectible member therein, another member mounted in the first said member, a reservoir for liquid, a pump connected to the reservoir, a conduit from the reservoir to the bottom of the liquid container, a conduit from adjacent the top of said container to the reservoir, an air pump, a conduit therefrom to the first-mentioned member, a conduit from the member mounted in said first-mentioned member to the air pump, said conduit having a vent therein, and a single control for operating both said pumps.

7. In an airplane, a fuselage and a canopy, a crash strut projectible above the canopy to support the weight and impact of the fuselage when it inverts against a landing area, means for extending and retracting said crash strut, said strut including a hydraulic shock absorber, said hydraulic shock absorber being mounted concentrically in said projectible crash strut, and means for projecting said shock absorber independently of the said crash strut.

8. In an airplane having a fuselage, a retractable landing gear mounted below the fuselage, means for extending and retracting said landing gear, a crash protector mounted above the fuselage, means for extending and retracting said crash protector into and out of the slipstream around the fuselage, said crash protector in its extended position being capable of breaking the impact and supporting the weight of the airplane should the latter invert in taking off or landing, and common control means for simultaneously actuating the extending and retracting means of both the landing gear and crash protector.

ALEXANDER P. DE SEVERSKY.